W. B. Jones,
Motor.

N° 64,881.   Patented May 21, 1867.

Witnesses:
Theo Tysch
J. A. Service

Inventor:
H. B. Jones
Per Munn & Co
Attorneys

United States Patent Office.

W. B. JONES, OF FRANKLIN, KENTUCKY.

Letters Patent No. 64,881, dated May 21, 1867.

---

IMPROVEMENT IN MOTIVE POWER.

---

The Schedule referred to in these Letters Patent and making part of the same.

---

TO ALL WHOM IT MAY CONCERN:

Be it known that I, W. B. JONES, of Franklin, in the county of Simpson, and State of Kentucky, have invented a new and improved Motive Power; and I do hereby declare that the following is a full, clear, and exact description thereof, which will enable others skilled in the art to make and use the same, reference being had to the accompanying drawing, forming a part of this specification, in which—

Figure 1:
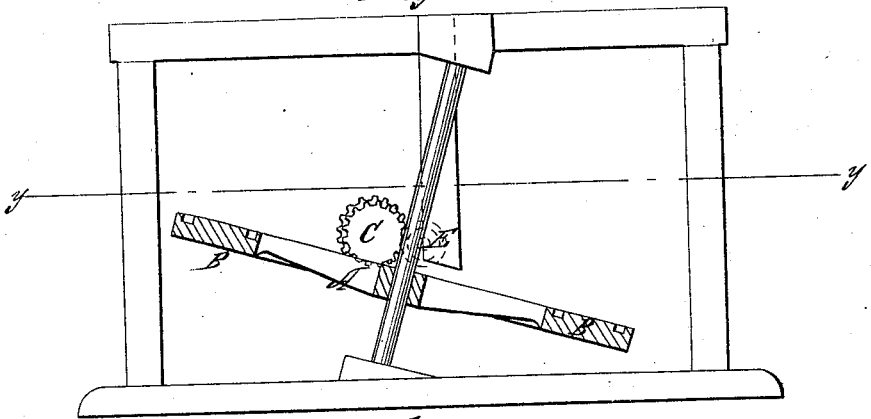
Figure 2:
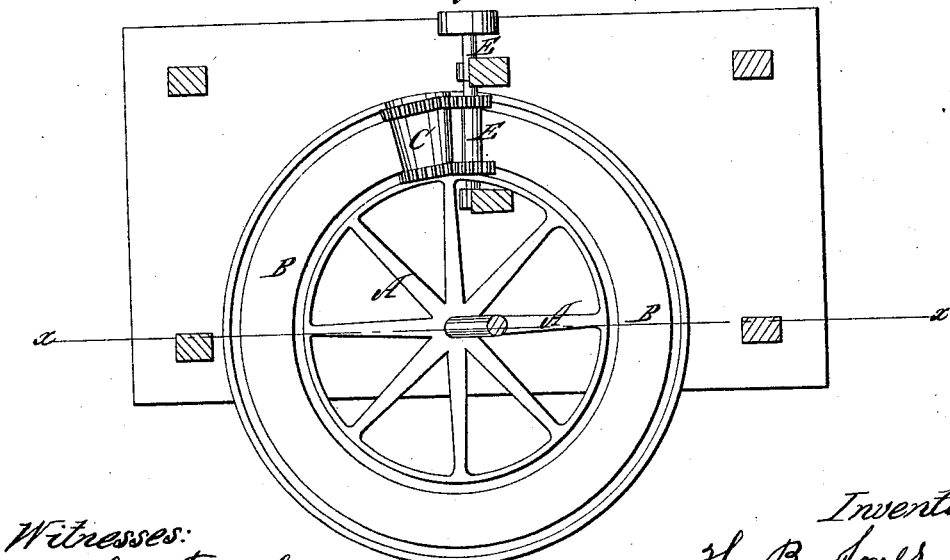

Figure 1 is a longitudinal vertical section, taken in the plane of the line $x\,x$, fig. 2; and Figure 2, a horizontal section, taken in the plane of the line $y\,y$, fig. 1.

Similar letters of reference indicate like parts.

The new motive power embraced in the present invention consists of an inclined wheel, A, made of iron, the inclination being about ten or twelve degrees. On the outer edge or circumference B of this wheel A I place a conical cylinder, C, of iron, or cast iron, hollow and filled with lead, or such weight as may be desired. The wheel and cylinder are so made and arranged that only the ends of the cylinder touch the wheel. The larger or outer end of the cylinder runs or lies in the circumference of the wheel. The rims of the wheel, or slight elevations on its face, on which the two ends of the cylinder rest, are to be fluted, and the ends of the cylinder are to be fluted in the same manner. This cylinder is to be placed on that part of the circumference of the inclined wheel, equidistant from the extreme upper and lower parts of its circumference when stationary or not running. Touching this cylinder is an iron lever-shaft, E, also conical, at the ends of which, and where it comes in contact with the fluted ends of the cylinder, the shaft is so enlarged that it will come in contact with the cylinder at no other place, these enlargements being fluted so as to mesh into the fluting of the cylinder. To this lever-shaft is to be attached a crank. From the centre of the lever-shaft to the circumference of the same is the fulcrum of the lever. By turning the lever-shaft as if to roll the cylinder up the inclined plane on the surface of the wheel, a rotary motion is given to the cylinder, which, by its gravity, remains in contact with the lever-shaft, and gives motion to the inclined wheel. Under the inclined wheel, at its circumference, is to be made a circle of cogs, which work in a wallower, the wallower being attached to a horizontal shaft, on which is to be a drum for propelling the machinery with bands. The inclined wheel is to be well braced, and not to rest upon the wallower. The cogs simply work easily in the wallower. The lever-shaft may be turned by any power which may be applied to it, as, for instance, by a small steam engine with a shaft, one end of which is attached to the piston and the other to the crank of the lever-shaft. The economy of power, or the power to be used, may be increased by the smallness of the lever-shaft; and the length of the crank and the speed of the inclined wheel may be regulated by the size of the lever-shaft. A lever-shaft of six inches in diameter, making a three-inch fulcrum, will at each revolution move the inclined wheel eighteen inches. The lever-shaft is to work in sockets at each end, made permanent by being attached to a frame above or in some other way. The socket at the larger end may be attached to a frame below. The lever-shaft should come in contact with the cylinder at some point above a horizontal line drawn across the ends of the cylinder. By this combination of gravitation and lever power an immense power can be obtained with a heavy cylinder and small lever-shaft, making consequently a short fulcrum, with the aid of very little additional power. This power, however, might be obtained at the expense of speed in the machinery to be propelled. To give sufficient speed, the lever-shaft must be made proportionately large, and the larger said shaft the greater will be the power required by the engine.

It is apparent from the above, that the gravitation power of the cylinder will be so slightly impeded by the small quantity of friction that it will have very nearly the power which the same weight in horses placed on an inclined wheel would have; and that, by the combination, one-half or more of the generating power now used by steam is saved, and while it may not be useful in propelling very heavy machinery, such as now requires an engine say of one hundred horse-power, it is believed to be useful in doing the work now requiring an engine of say from twenty to forty horse-power, and that an engine of ten horse-power, attached to the machine working a crank of reasonable length, will do the work now done by an engine of twenty horse-power.

I claim as new, and desire to secure by Letters Patent—

The combination of the inclined wheel or frame A, cylinder C, and lever-shaft E, when arranged together so as to operate together, substantially in the manner and for the purpose described.

The above specification of my invention signed by me this     day of          1866.

W. B. JONES.

Witnesses:
S. R. HOPE,
R. C. McPHAILL.